US010288817B2

(12) United States Patent
Nguyen et al.

(10) Patent No.: US 10,288,817 B2
(45) Date of Patent: *May 14, 2019

(54) SPRING PUSH AND PUSH-PULL TAB FOR TIGHTLY SPACED FIBER OPTIC CONNECTORS

(71) Applicant: US Conec, Ltd, Hickory, NC (US)

(72) Inventors: Hiep V. Nguyen, Fort Mill, SC (US); Joseph P. Howard, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,047

(22) Filed: Nov. 27, 2017

(65) Prior Publication Data
US 2018/0081124 A1 Mar. 22, 2018

Related U.S. Application Data

(63) Continuation of application No. 15/429,229, filed on Feb. 10, 2017, now Pat. No. 9,829,644, which is a continuation of application No. 15/047,501, filed on Feb. 18, 2016, now Pat. No. 9,568,689.

(60) Provisional application No. 62/117,490, filed on Feb. 18, 2015.

(51) Int. Cl.
*G02B 6/38* (2006.01)

(52) U.S. Cl.
CPC ........... *G02B 6/3821* (2013.01); *G02B 6/381* (2013.01); *G02B 6/389* (2013.01); *G02B 6/3893* (2013.01); *G02B 6/3898* (2013.01)

(58) Field of Classification Search
CPC ...... G02B 6/381; G02B 6/3821; G02B 6/389; G02B 6/3893; G02B 6/3898
See application file for complete search history.

(56) References Cited

U.S. PATENT DOCUMENTS

| | | | |
|---|---|---|---|
| 4,496,213 A | 1/1985 | Borsuk | |
| 6,019,521 A * | 2/2000 | Manning | G02B 6/3869 385/56 |
| 6,224,268 B1 * | 5/2001 | Manning | G02B 6/3893 385/56 |
| 6,357,929 B1 | 3/2002 | Roehrs et al. | |
| 6,648,520 B2 | 11/2003 | McDonald et al. | |
| 7,077,576 B2 | 7/2006 | Luther et al. | |
| 8,198,791 B2 | 6/2012 | Suzuki | |
| 8,393,803 B2 | 3/2013 | Hogue | |
| 8,633,640 B2 | 1/2014 | Kyuno | |
| 9,195,010 B2 | 11/2015 | Shimazu et al. | |
| 9,442,258 B2 | 9/2016 | Mougin | |
| 9,568,689 B2 * | 2/2017 | Nguyen | G02B 6/389 |
| 9,829,644 B2 * | 11/2017 | Nguyen | G02B 6/389 |

(Continued)

*Primary Examiner* — Akm E Ullah
(74) *Attorney, Agent, or Firm* — Michael L. Leetzow, P.A.; Shubhrangshu Sengupta

(57) ABSTRACT

A spring push for a fiber optic connector includes an engagement member having a slot to receive a handle that also engages a distal portion of the engagement number. The spring push, along with the handle, allows for fiber optic connectors to be installed and removed from adapters in high density applications. The spring push can be installed into a connector housing and, along with other components, be a fiber optic connector. The engagement member may also originate from other parts of the fiber optic connector.

18 Claims, 12 Drawing Sheets

(56) References Cited

U.S. PATENT DOCUMENTS

| | | | |
|---|---|---|---|
| 2002/0076164 A1* | 6/2002 | Childers | G02B 6/3869 385/76 |
| 2002/0110333 A1 | 8/2002 | Yang | |
| 2013/0142489 A1 | 6/2013 | Isenhour et al. | |
| 2016/0091671 A1 | 3/2016 | Nguyen et al. | |

* cited by examiner

SPRING PUSH AND PUSH-PULL TAB FOR TIGHTLY SPACED FIBER OPTIC CONNECTORS

REFERENCE TO RELATED CASE

This application claims priority under 35 U.S.C. § 119 (e) to provisional application No. 62/117,490 filed on Feb. 18, 2015, and also claims priority to U.S. patent application Ser. No. 15/429,229 filed on Feb. 10, 2017 and to U.S. Pat. No. 9,568,689, issued on Feb. 14, 2017, under 35 U.S.C. § 120, the contents of which are hereby incorporated by reference in their entirety.

BACKGROUND OF THE INVENTION

Field of the Invention

Fiber optic connectors, and the locations where they are installed, are becoming smaller and smaller. This is especially true in high density applications. The fiber optic connectors are now smaller than a person's finger and they are spaced such that a person can not easily grasp individual fiber optic connectors mounted in an adapter in the high density areas. Thus, it can be very difficult to install a fiber optic connector in, and uninstall from, its respective adapter. Adjacent fiber optic connectors are generally located too close to allow manual insertion and removal of a single fiber optic connector using the connector's outer housing as intended, particularly, when used in higher density applications. To facilitate these processes, a component was desired that possessed a smaller cross section that could be grasped to install and uninstall a fiber optic connector when in a high density application.

SUMMARY OF THE INVENTION

The present invention is directed to a spring push for use with a fiber optic connector that includes a main body having a forward facing surface, a rearward facing surface, and at least one side portion, two generally parallel extensions extending from the forward facing surface of the main body away from the rearward facing surface; the two generally parallel extensions configured to engage an elastic member therebetween and each of the parallel extensions having a projection to engage a connector housing of the fiber optic connector, a crimp portion extending from the rearward facing surface of the main body and away from the forward facing surface, the crimp portion having a central opening to allow optical fibers to pass therethrough and between the two generally parallel extensions, and an engagement member having a first portion and a second portion, the first portion extending from the at least one side portion away from the main body and orthogonal to the central opening, the first portion having a slot, and the second portion extending from a distal end of the first portion and away from the rearward facing surface.

In some embodiments, the second portion is substantially parallel to the two generally parallel extensions.

In some embodiments, the spring push further includes a handle, the handle having an insert portion configured to be inserted into the slot of the engagement member.

In other embodiments, the engagement member and one of the two generally parallel extensions form an opening therebetween, the opening configured for receiving a portion of a connector housing and a portion of a handle that can be inserted into the slot.

According to another aspect of the present invention, there is a fiber optic connector that includes a connector housing, the connector housing further comprising a ferrule holder and a spring push, the spring push inserted into an opening from a back end of the ferrule holder and the connector housing having a latch disposed on a side surface, a ferrule disposed within the opening of the connector housing, an engagement member having a first portion extending away from the connector housing, the first portion having a slot, and a second portion extending from the first portion in a direction away from the back end of the ferrule holder, and a handle, the handle having an insert portion configured to be inserted into the slot of the engagement member.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
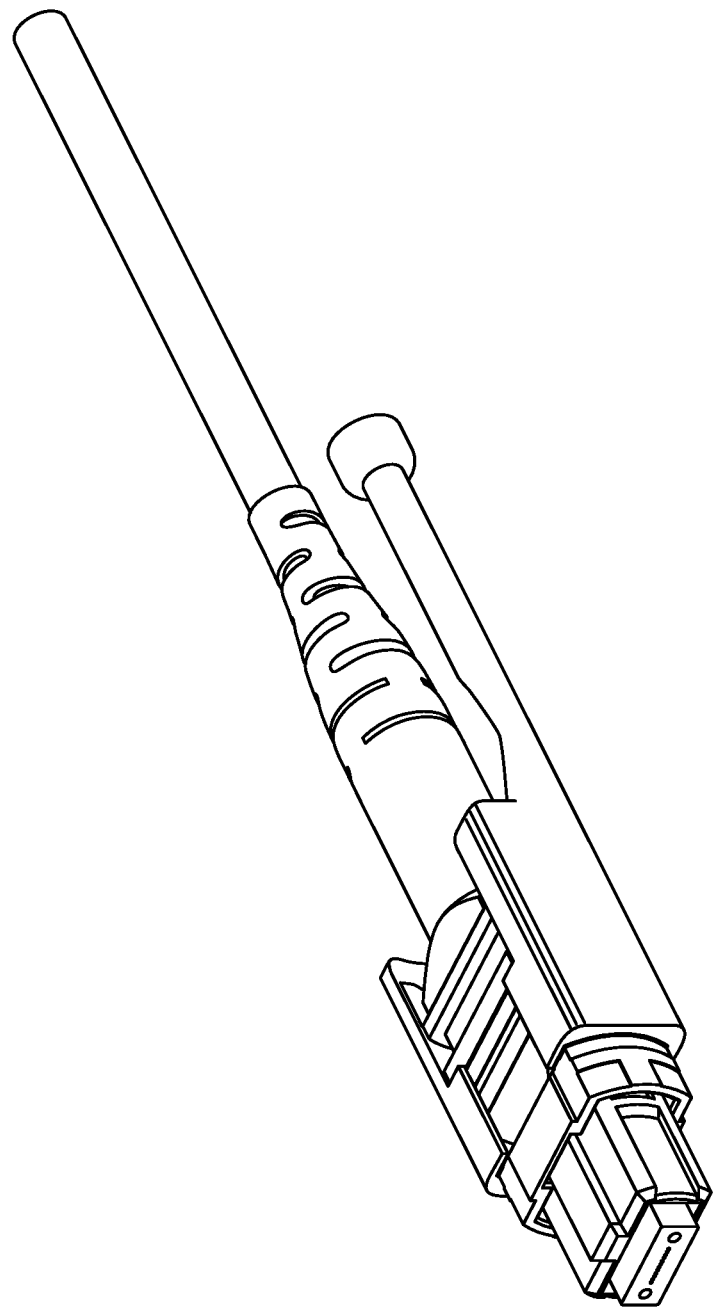
FIG. 1 is a prior art sleeve used to insert and remove fiber optic connectors in high density applications.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 illustrates a prior art push-pull sleeve that also assists in inserting and removing fiber optic connectors. The illustrated sleeve is disclosed and claimed in U.S. Pat. No.

8,559,781 and is assigned to the same applicant as the present application. The sleeve, having an integral handle, is disposed over the inner and outer connector housings of the fiber optic connector. As described in detail below, the present invention is more integral with a fiber optic connector.

Figure 2:
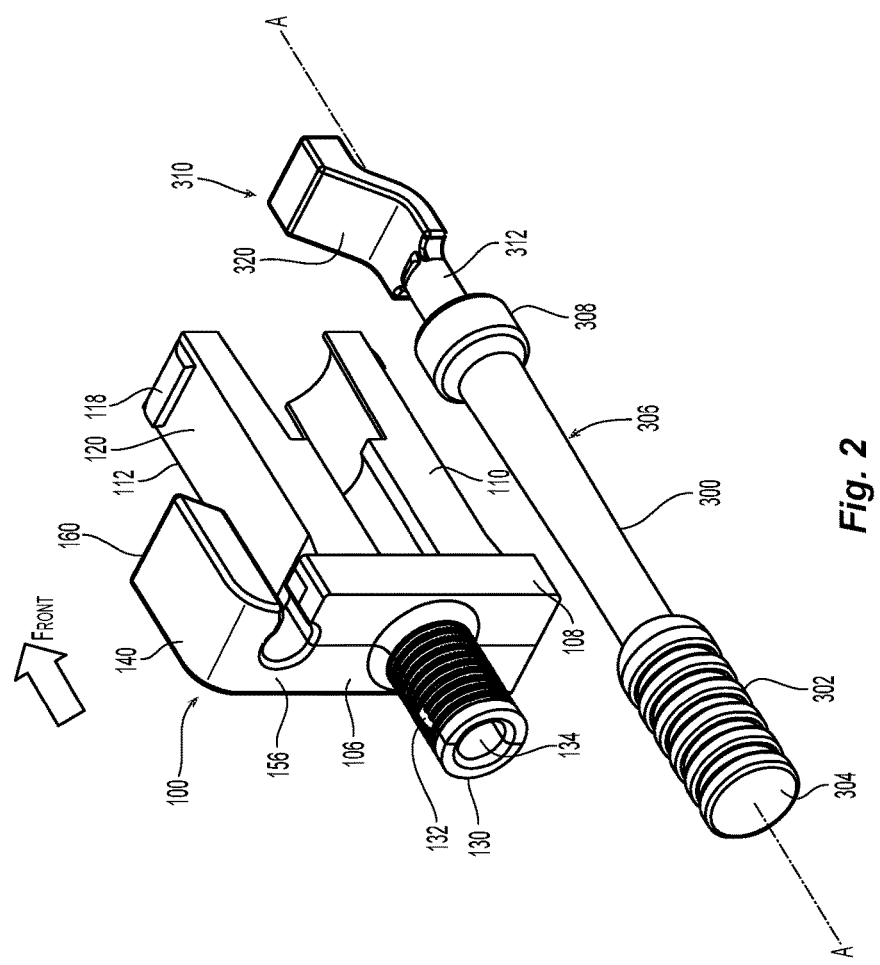
FIG. 2 is a perspective view of one embodiment of a spring push and handle according the present invention.
Figure 3:
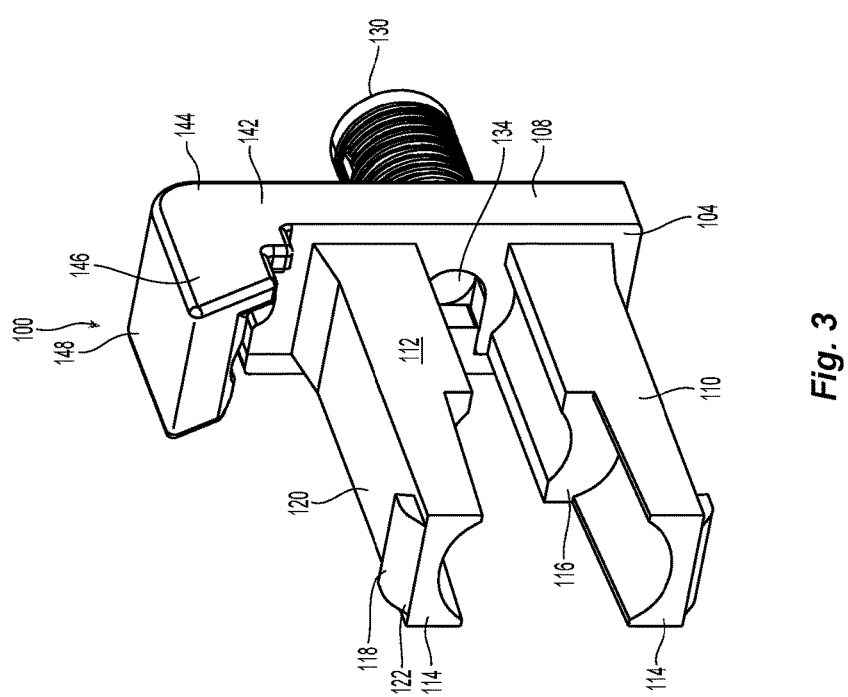
FIG. 3 is a perspective view of the spring push of FIG. 2 from the opposite side.
Figure 4:
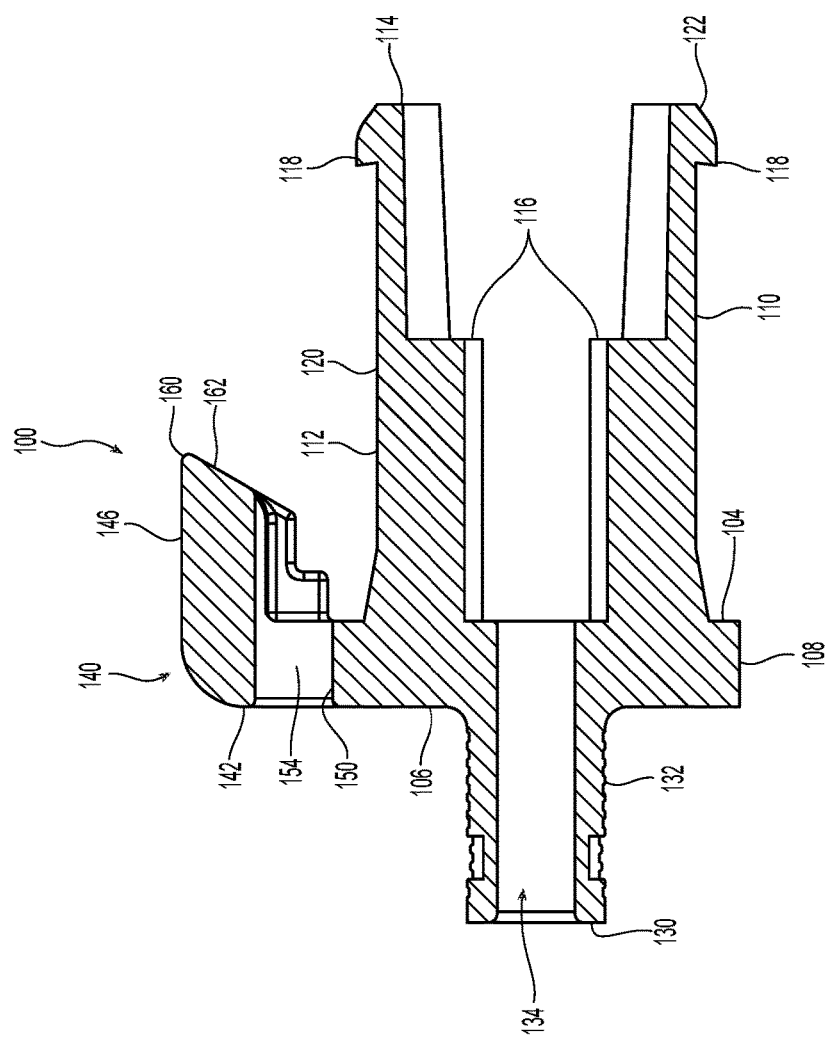
FIG. 4 is a cross section view of the spring push of FIG. 2.

One embodiment of a spring push 100 according to the present invention is illustrated in FIGS. 2-4. The spring push 100 can be used as a part of a fiber optic connector 200, illustrated in the later figures. The spring push 100 has a main body 102, the main body having a forward facing surface 104, a rearward facing surface 106, and side portions 108 (generally there are four side portions, but there could be more or fewer depending on the configuration of the connector housing). Extending from the forward facing surface 104 of the main body 102 are two generally parallel extensions 110,112. The two generally parallel extensions 110,112 are spaced to allow for an elastic member, preferably a coil spring, to bias a fiber optic ferrule (see, e.g., FIG. 8) toward the front (away from the spring push 100) of the fiber optic connector 200. Each of the two generally parallel extensions 110,112 have a front end 114. A forward facing surface 116 is disposed on each of the two generally parallel extensions 110,112 to engage the elastic member disposed therebetween. See FIGS. 3 & 4. The term "front" and/or "forward" as used herein means that direction where the fiber optic connector would mate with another fiber optic connector or device, while the term rear is used to mean the direction from which the optical fibers come. So turning to FIGS. 2 & 4, front is the direction shown by the arrow and "back" or "rearward" is the opposite direction.

Each of the two generally parallel extensions 110,112 also have a projection 118 on an outside surface 120 to engage a corresponding opening in the fiber optic connector 200 to engage recesses or openings 202 to retain the spring push 100 within the connector housing 204 of the fiber optic connector 200. See FIGS. 5, 8, and 10-11. The projections 118 may also have a chamfered leading edge 122 that allows for the front end 114 of the two generally parallel extensions 110,112 to more easily enter into the central opening 206 of the connector housing 204.

Extending from the rearward facing surface 106 is a crimp portion 130. The crimp portion 130 allows for the Kevlar cords and cable jacket (or other structural members) to be secured to the spring push 100 and the fiber optic connector 200 as is known in the art. As illustrated in the figures, the crimp portion 130 has an outer surface 132 that is preferably round and a round central opening 134. However, the shape of the outer surface 132 and the central opening 134 may take other shapes, including oval, hexagonal, rectangular, etc. and still fall within the scope of the present invention.

An engagement member 140 extends from one of the side portions 108 of the main body 102 of the spring push 100. The engagement member 140 has a first portion 142 generally extends upward (or outward and away from the main body 102) between the crimp portion 130 and the two generally parallel extensions 110,112 to a distal portion 144. See FIG. 3. The engagement member 140 also includes a second portion 146, with a proximal portion 148 that extends from the distal portion 144 of the first portion 142 toward the front end 114 of the two generally parallel extensions 110,112.

The first portion 142 of engagement member 140 has a slot 150 that extends into the engagement member 140. The slot 150 receives a handle 300, which is described in more detail below, both in structure and function. The slot 150 preferably makes an opening on another side of the main body 102—in this case about 90 degrees from side portion 108 from which the engagement member extends. See FIG. 5. For obvious reasons, the slot 150 can not come in from the bottom because of the main body 102, and coming in from the top presents other issues, including the presence of the second portion 146 and its function, described in detail below. As would be obvious to one of skill in the art, the slot 150 could also come in from the side opposite to that shown in the figures. The slot 150 has a portion 152 with a generally rectangular configuration that begins at the edge of the first portion 142 and then transitions into a circular portion 154, which corresponds to the configuration of the handle 300. See FIG. 2. If the handle 300 had a different configuration, the portion 154 could have a corresponding configuration.

Figure 9:
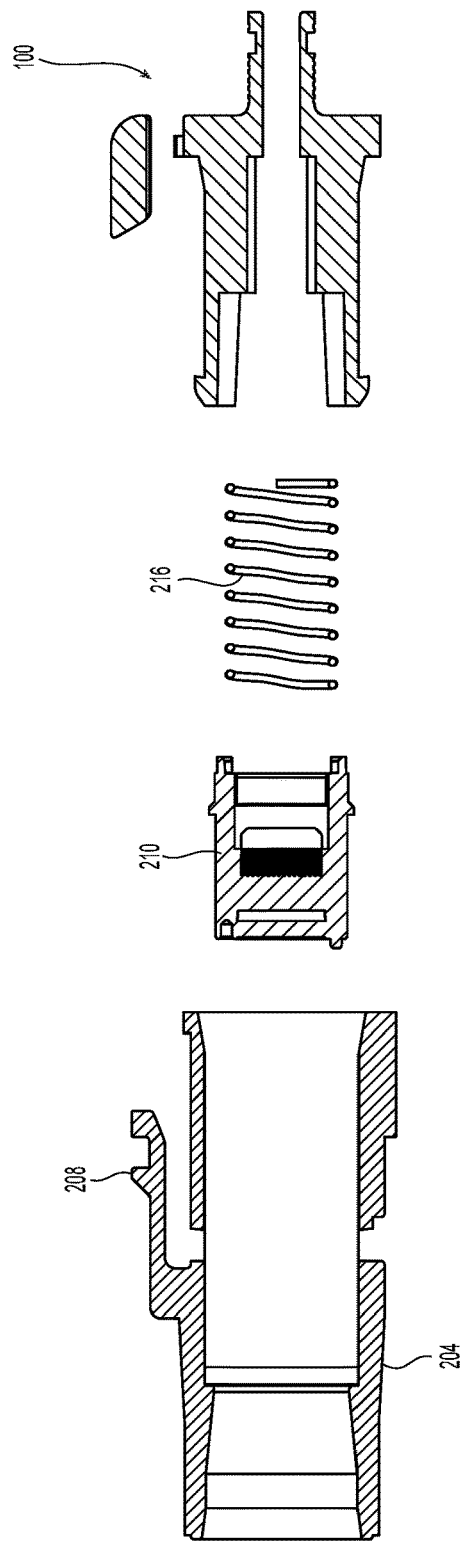
FIG. 9 is an exploded view of the fiber optic connector of FIG. 5 in cross-section.

The first portion 142 of engagement member 140 is illustrated as having a rear surface 156 that is flush with the rearward facing surface 106. See, e.g., FIG. 9. While this allows for the spring push 100 to be clean and streamlined, it is not necessary and there could be a step between the engagement member 140 and the rearward facing surface 106, or even a smooth transition between the two.

Figure 5:
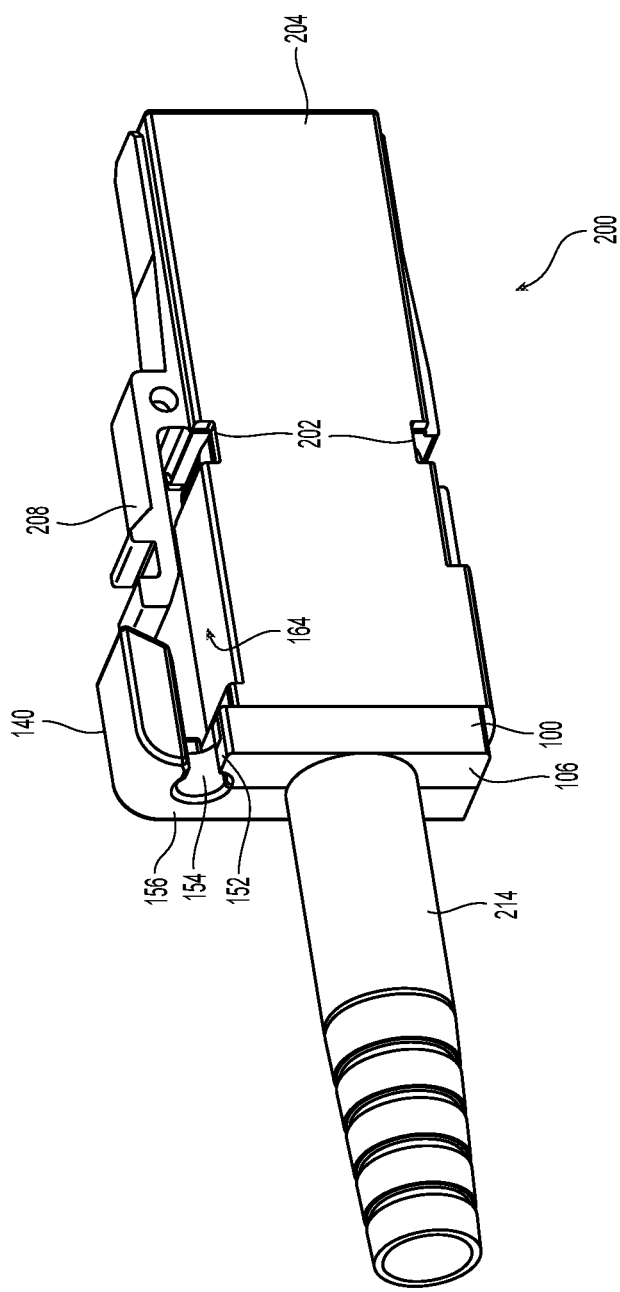
FIG. 5 is a perspective view of the spring push of FIG. 2 installed in a connector housing to make one embodiment of a fiber optic connector according to the present invention.
Figure 6:
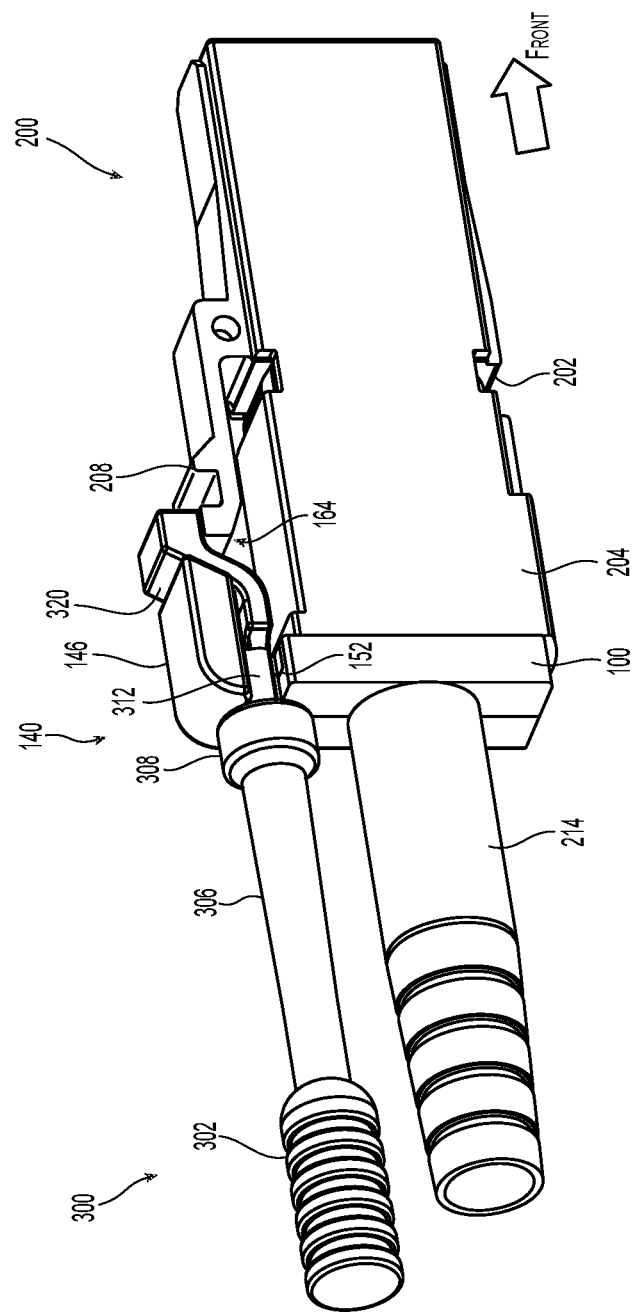
FIG. 6 is a perspective view of the fiber optic connector of FIG. 5 with a handle inserted into the engagement member of the spring push.
Figure 7:
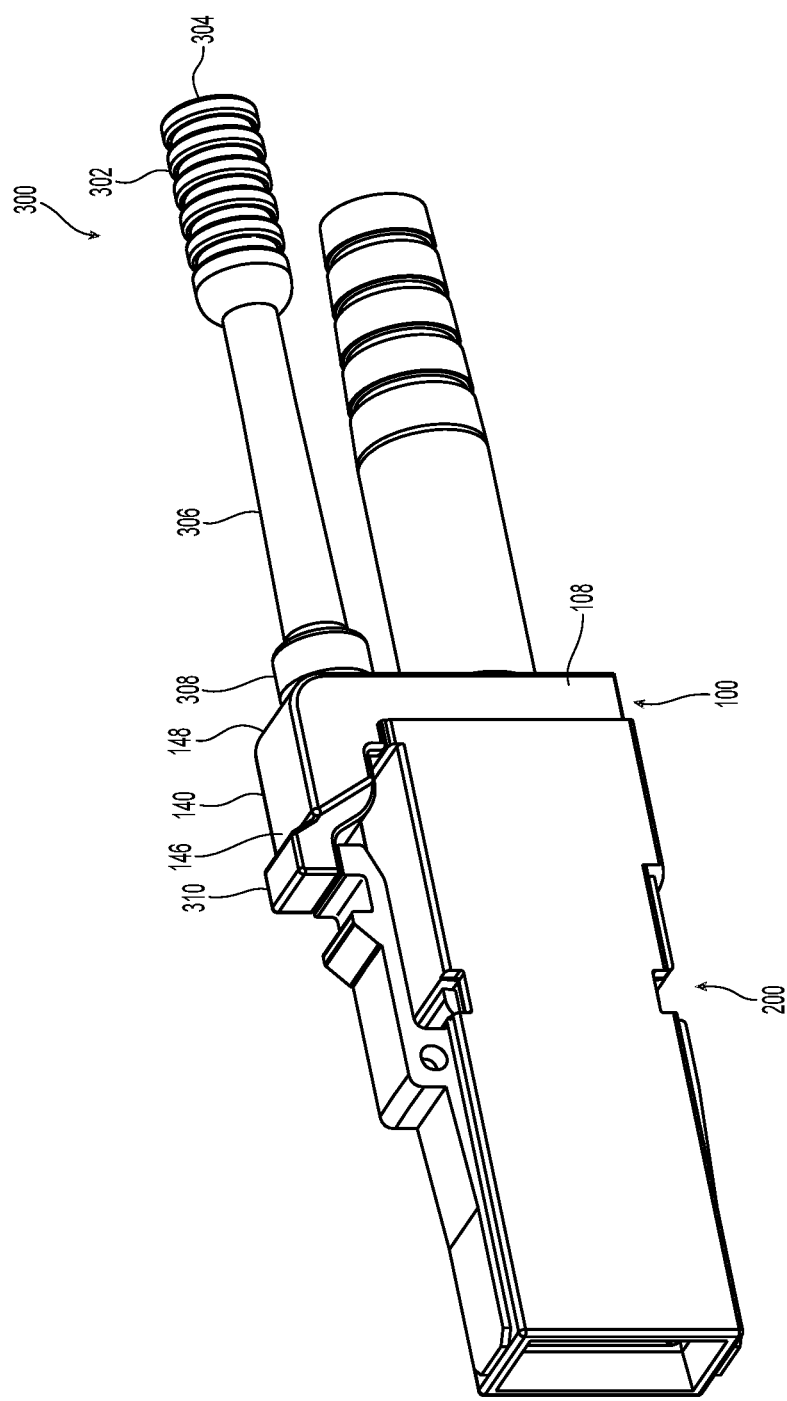
FIG. 7 is a perspective view of the fiber optic connector of FIG. 6 from the opposite side.

At the distal portion 144 of the first portion 142, the engagement member makes a turn of about 90 degrees to begin the second portion 146. The second portion extends forward, in the direction of the front ends 114 of the two generally parallel extensions 110,112. Preferably the second portion 146 is parallel to the two generally parallel extensions 110,112, but could be oriented somewhat differently if desired. The second portion 146 terminates at a distal end 160 and a terminal surface 162, which faces downwards toward the two generally parallel extensions 110,112. See FIGS. 8 and 10-12. As can be seen in FIGS. 5 & 6, there is a space 164 between the second portion 146 and the extension 112. This space 164 is sufficient to accommodate the handle 300 and the connector housing 204.

The engagement member 140, when the spring push 100 is inserted into the connector housing 204, extends partially over the connector housing 204 and the terminal surface 162 is near the latch 208 on the connector housing 204, reasons for which will be clear below. As is known in the art, the latch 208 secures the connector housing 204 into an adapter, such as the adapter 350 illustrated in FIG. 10, to keep the fiber optic connector 200 from being inadvertently removed from the adapter 350.

A handle 300 is illustrated in FIGS. 2, 6-7, and 10-12. A majority of the handle 300 lies along an axis A-A. A grasping portion 302 is at a first or proximal end 304. The handle then has middle portion 306 that is substantially circular in cross section and has a expanded portion (or hub) 308 extending radially outward from the middle portion 306. Between the expanded portion (or hub) 308 and the distal end 310 is an insert portion 312 that is configured to be inserted into the slot 150. As illustrated, the insert portion 312 is circular in cross section and matches the configuration of the circular portion 154. When the insert portion 312 is inserted into the slot 150 (see, e.g., FIGS. 6 & 10-11), the expanded portion (or hub) 308 engages the rear surface 156 of first portion 142 of engagement member 140. Thus, an operator can push on the handle 300 and the force is translated to the engagement member 140 and the fiber optic connector through the rear surface 156 of first portion 142.

The distal end 310 of the handle 300 extends upward (in the figures, but away from the two generally parallel extensions 110,112 and out of the axis A-A) so that it extends beyond the terminal surface 162 of the distal end 160 of second portion 146 and rests on the latch 208 when the handle 300 is disposed within the slot 150. The top surface 320 of the distal end 310 engages or touches the terminal surface 162 of the distal end 160 of second portion 146 while a bottom surface 322 engages or touches the latch 208. See FIGS. 6-7 and 10-12. When an operator wants to remove a fiber optic connector with the spring push 100 and handle 300, the operator grasps the grasping portion 302 of the handle 300 at a first or proximal end 304 and pulls rearwardly (to the left in FIG. 9), and the handle 300 moves slightly rearwardly relative to the spring push 100 and engagement number 140. As a result, the top surface 320 engages the terminal surface 162 of the distal end 160 of second portion 146, which forces the distal end 320 of the handle 300 to move downward toward the spring push 100 and simultaneously on the latch 208. See FIG. 12. The movement of the latch 208 from the distal end 320 is sufficient to allow the fiber optic connector 200 to be removed from the adapter with the handle 300. The distal end 310 is configured so that it cannot flex enough so that the top surface 320 disengages from the terminal surface 162 of the second portion 146. Thus, the distal end 310 engages the second portion 146 with enough force to allow the operator to remove the fiber optic connector from the adapter.

Figure 8:
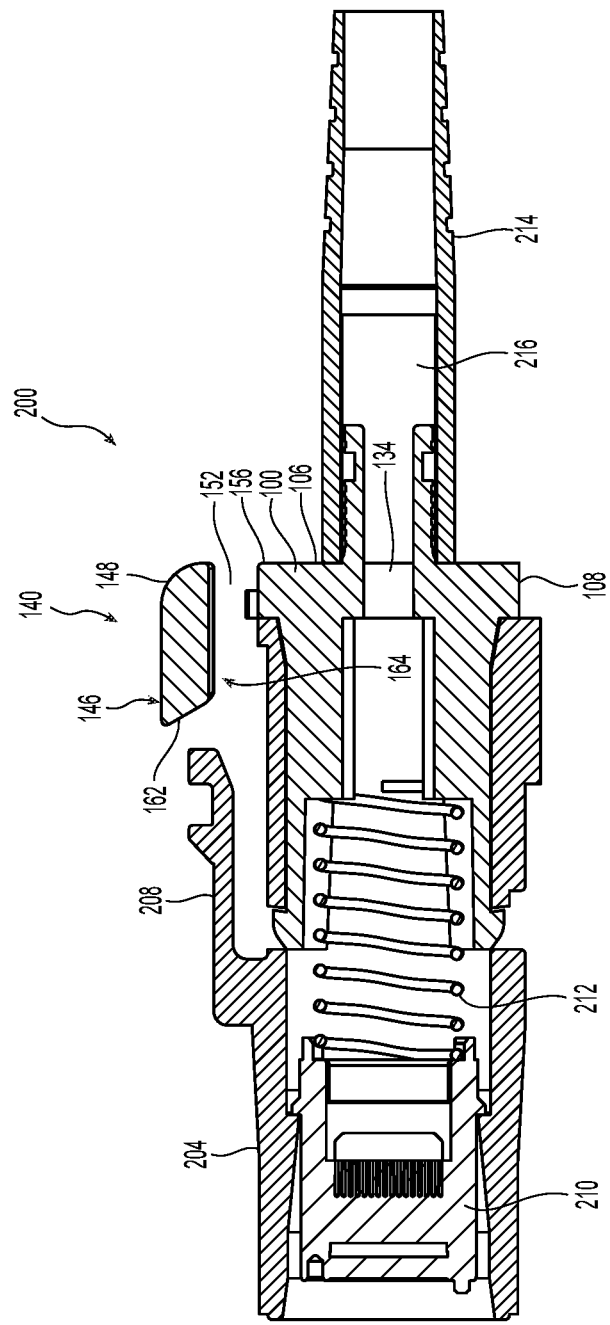
FIG. 8 is a cross-sectional view of the fiber optic connector of FIG. 5.
Figure 10:
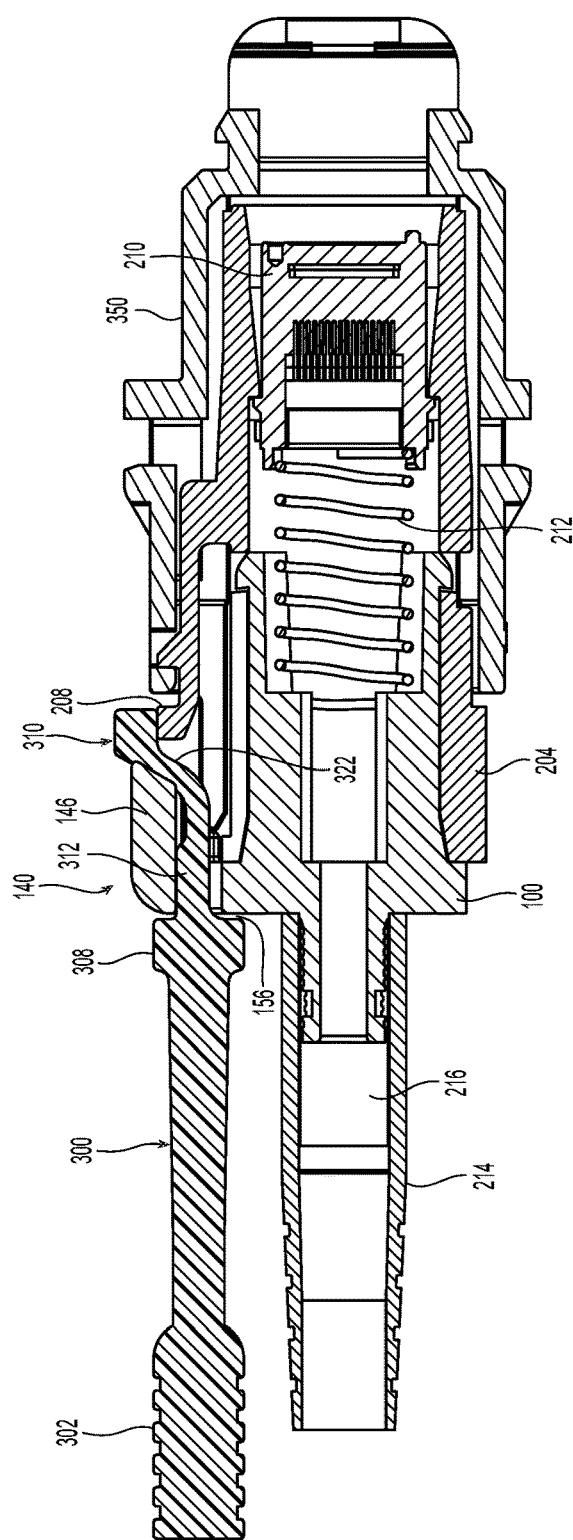
FIG. 10 is a cross-sectional view of the fiber optic connector of FIG. 5 installed in an adapter.
Figure 11:
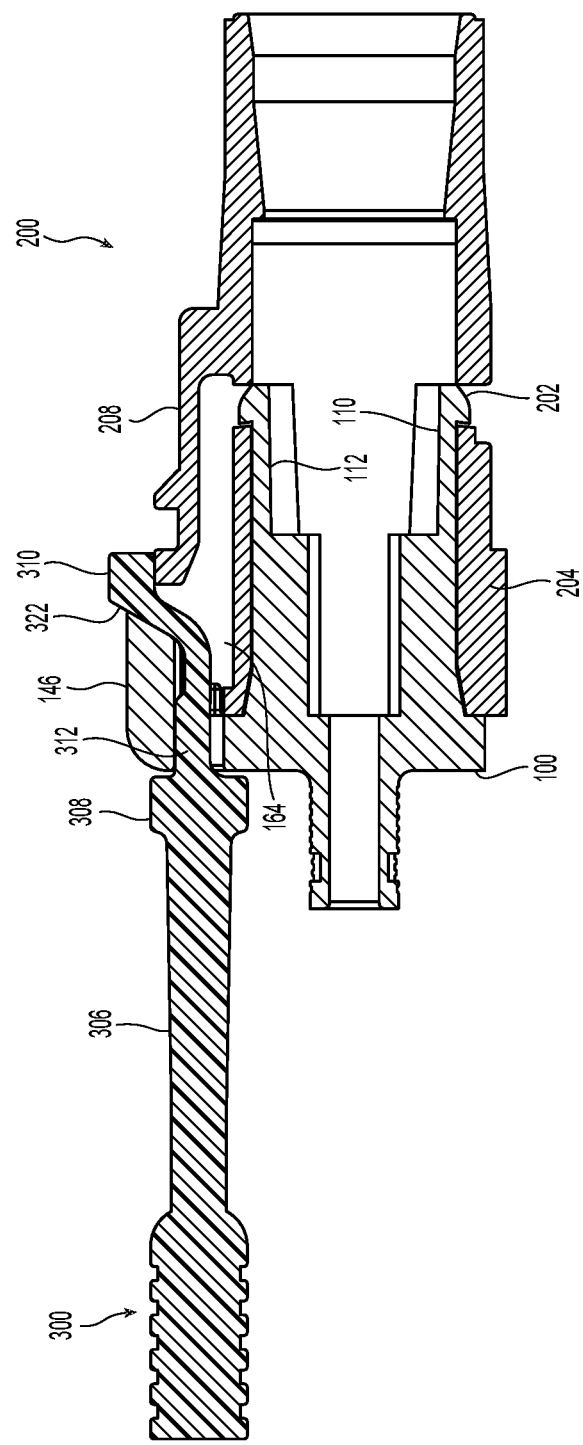
FIG. 11 is a cross-sectional view of the fiber optic connector of FIG. 9 with the handle disposed within the spring push.
Figure 12:
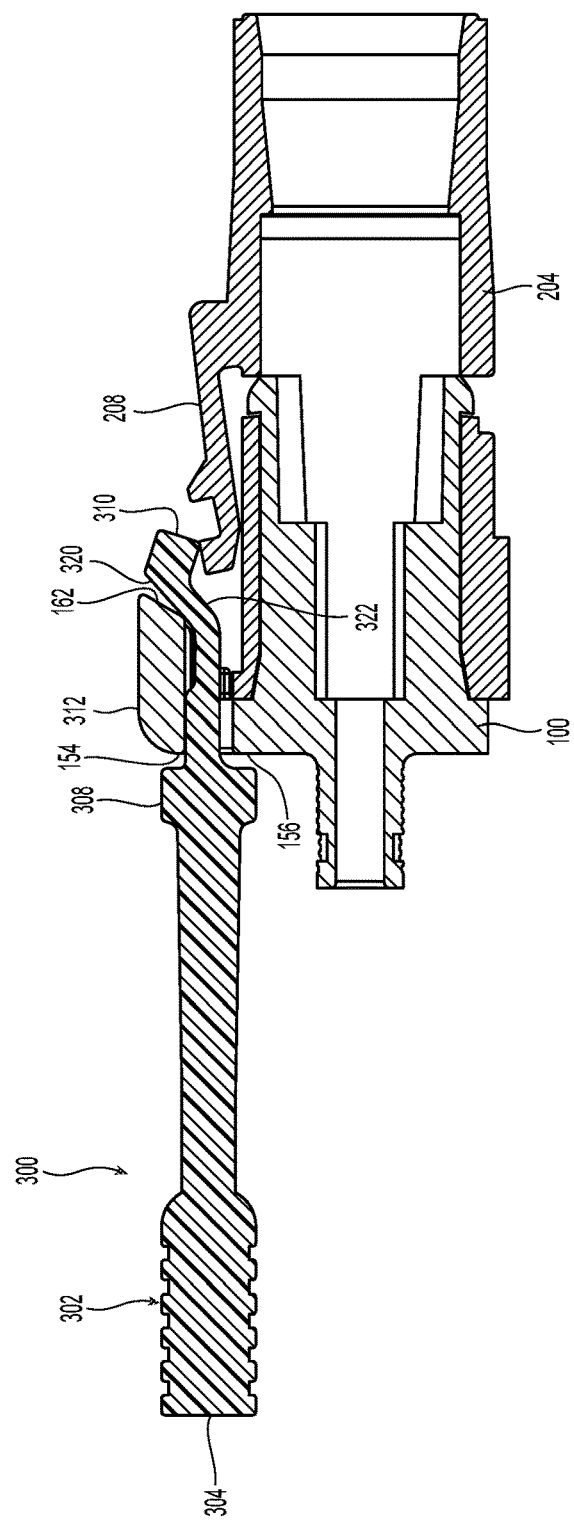
FIG. 12 is a cross-sectional view of the fiber optic connector of FIG. 9 with the handle being pulled rearwardly.

As referenced to above and illustrated in FIGS. 5-6 & 8-9, one embodiment of a fiber optic connector 200 that can be used with the inventive spring push 100 includes the connector housing 204, a ferrule 210, a spring 212, the spring push 100, and a boot 214. A crimp ring 216, disposed between the crimp portion 130 and the boot 214 is also illustrated in FIGS. 8 and 10 for completeness. Additional fiber optic connector elements may also be included but are not illustrated herein, such as guide pins, a pin keeper, etc. These fiber optic connector elements may also have other configuration and still come within the scope of the present invention and the appended claims. For example, the spring could have a configuration other than the rectangular shape illustrated herein.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A spring push for use with a fiber optic connector comprising:
    a main body having a forward facing surface, a rearward facing surface, and at least one side portion;
    two generally parallel extensions extending from the forward facing surface of the main body away from the rearward facing surface, the two generally parallel extensions configured to retain an elastic member therebetween; and
    an engagement member having a first portion and a second portion, the first portion extending from the at least one side portion away from the main body and the second portion extending from a distal end of the first portion and away from the rearward facing surface.

2. The spring push according to claim 1, wherein the second portion is substantially parallel to the two generally parallel extensions.

3. The spring push according to claim 1, wherein the first portion has a slot and the slot has a rounded opening to receive a portion of a handle.

4. The spring push according to claim 3, further comprising a handle, the handle having an insert portion configured to be inserted into the slot of the engagement member.

5. The spring push according to claim 1, wherein a distal end of the second portion has a terminal surface that faces the two generally parallel extensions.

6. The spring push according to claim 5, wherein the terminal surface engages a portion of a handle inserted into the slot of the engagement member.

7. The spring push according to claim 1, wherein the first portion has a slot and the slot opens from a side other than the side portion on which the engagement member is disposed.

8. The spring push according to claim 1, wherein the engagement member and one of the two generally parallel extensions form an opening therebetween, the opening configured for receiving a portion of a connector housing and a portion of a handle that can be inserted into the slot.

9. The spring push according to claim 1, wherein at least a portion of the engagement member is flush with the rearward facing surface of the main body.

10. The spring push according to claim 1, further comprising a crimp portion extending away from the rearward facing surface and away from the forward facing surface.

11. A spring push for use with a fiber optic connector comprising:
    a main body having a forward facing surface, a rearward facing surface, and at least one side portion;
    two generally parallel extensions extending from the forward facing surface of the main body away from the rearward facing surface; and
    an engagement member having a first portion and a second portion, the first portion extending from the at least one side portion away from the main body and the second portion extending from a distal end of the first portion and away from the rearward facing surface.

12. A fiber optic connector comprising:
    a connector housing, the connector housing further comprising a ferrule holder and a spring push, the spring push inserted into an opening from a back end of the ferrule holder;
    a ferrule disposed within the opening of the ferrule holder; and
    an engagement member having a first portion extending away from the connector housing and a second portion extending from the first portion in a direction away from the back end of the ferrule holder.

13. The fiber optic connector according to claim 12, further comprising a latch disposed on a side surface of the connector housing and wherein the first portion includes a slot and a handle engages the latch and the slot.

14. The fiber optic connector according to claim 13, wherein the handle extends between a proximal end and a distal end and having a middle portion, the middle portion having an expanded portion extending radially outward from the middle portion proximally from the insert portion, the distal end having a flat surface to engage the latch.

15. The fiber optic connector according to claim 14, wherein the handle has a longitudinal axis and the distal end of the handle curves away from the longitudinal axis to engage the second portion of the engagement member and the latch.

16. The fiber optic connector according to claim 14, wherein pulling the proximal end of the handle away from the connector housing causes the distal end of the handle to flex after engaging a forward facing surface of the engagement member thereby causing the distal end to push on the latch.

17. The fiber optic connector according to claim 13, wherein the slot of the engagement member has a first diameter and the expanded portion of the handle has a second diameter, the first diameter being smaller than the second diameter.

18. The fiber optic connector according to claim 11, wherein the engagement member extends from a portion of the spring push.

* * * * *